US011289976B2

United States Patent
Ramtahal et al.

(10) Patent No.: US 11,289,976 B2
(45) Date of Patent: Mar. 29, 2022

(54) STATOR STRUCTURE

(71) Applicant: GENERAL ELECTRIC RENOVABLES ESPAÑA, S.L., Barcelona (ES)

(72) Inventors: Sadeo Ramtahal, Schenectady, NY (US); Julio César Urresty, Barcelona (ES); Szymon Stanislaw Bankowski, Warsaw (PL); Thomas Drots, Nantes (FR); Pawel Siwak, Warsaw (PL); Grzegorz Pacocha, Warsaw (PL)

(73) Assignee: GENERAL ELECTRIC RENOVABLES ESPAÑA, S.L., Barcelona (ES)

( * ) Notice: Subject to any disclaimer, the term of this patent is extended or adjusted under 35 U.S.C. 154(b) by 0 days.

(21) Appl. No.: 16/943,549

(22) Filed: Jul. 30, 2020

(65) Prior Publication Data

US 2021/0036579 A1 Feb. 4, 2021

(30) Foreign Application Priority Data

Jul. 31, 2019 (EP) .................................... 19305994

(51) Int. Cl.
*H02K 9/02* (2006.01)
*H02K 1/16* (2006.01)
(Continued)

(52) U.S. Cl.
CPC .................. *H02K 9/02* (2013.01); *H02K 1/16* (2013.01); *H02K 3/47* (2013.01); *H02K 5/128* (2013.01); *H02K 7/1838* (2013.01)

(58) Field of Classification Search
CPC ............ H02K 1/16; H02K 3/47; H02K 5/128; H02K 9/02; H02K 7/18; H02K 7/183; H02K 7/1838
See application file for complete search history.

(56) References Cited

U.S. PATENT DOCUMENTS 7,057,305 B2 * 6/2006 Kruger-Gotzmann .... F03D 9/25
290/55
7,548,008 B2 * 6/2009 Jansen ..................... H02K 1/06
310/266

(Continued)

FOREIGN PATENT DOCUMENTS

CN 109861438 A 6/2019

OTHER PUBLICATIONS

European Search Report and Opinion Corresponding to EP19305994 dated Jan. 31, 2020.

*Primary Examiner* — Naishadh N Desai
(74) *Attorney, Agent, or Firm* — Dority & Manning, P.A.

(57) ABSTRACT

In a first aspect, a stator structure for an electrical machine is provided. The stator structure comprises a circumferential support having an external rim to support a plurality of electrical windings. The circumferential support comprises an air entrance, an air distribution channel and a plurality of axial air openings. The air entrance provides a passage between the air distribution channel and an outside of the stator structure. The air distribution channel extends through a portion of the circumferential support to circumferentially distribute an air flow from the air entrance. The plurality of axial air openings provides a passage between the air distribution channel and an outer side of the external rim to guide an air flow from the air distribution channel to the outer side of the external side. The plurality of axial air openings comprises an aperture, wherein the apertures are sized and spaced such that the air flow is substantially uniform along the circumference of the outer side of the external rim. In a further aspect, an electrical generator comprising a stator structure according to any of the examples herein described is provided.

14 Claims, 6 Drawing Sheets

(51) Int. Cl.
*H02K 3/47* (2006.01)
*H02K 5/128* (2006.01)
*H02K 7/18* (2006.01)

(56) References Cited

U.S. PATENT DOCUMENTS

| | | | | |
|---|---|---|---|---|
| 7,893,576 | B2* | 2/2011 | Salamah | H02K 1/32 |
| | | | | 310/61 |
| 8,047,774 | B2* | 11/2011 | Bagepalli | H02K 7/1823 |
| | | | | 415/176 |
| 9,273,670 | B2* | 3/2016 | Li | F03D 7/0272 |
| 2007/0222223 | A1* | 9/2007 | Bagepalli | F03D 9/25 |
| | | | | 290/55 |
| 2010/0102657 | A1 | 4/2010 | Booth et al. | |
| 2010/0164228 | A1* | 7/2010 | Matsuo | F03D 80/60 |
| | | | | 290/52 |
| 2011/0272949 | A1* | 11/2011 | Matsuo | F03D 9/25 |
| | | | | 290/55 |
| 2012/0112570 | A1 | 5/2012 | Les Besnerais | |
| 2012/0205998 | A1* | 8/2012 | Seibicke | F03D 80/60 |
| | | | | 310/64 |
| 2014/0175919 | A1* | 6/2014 | Miyamoto | H02K 9/19 |
| | | | | 310/54 |

* cited by examiner

STATOR STRUCTURE

The present disclosure relates to stator structures, stators for electrical machines having a stator structure, and electrical machines.

BACKGROUND

Electrical machines, such as motors and generators, generally comprise a rotor structure and a stator structure. Large electrical generators may be permanent magnet excited generators (PMG) or electrically excited generators.

Such generators may be used for example in wind turbines, in particular in offshore wind turbines. Wind turbines generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Such a direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, permanent magnet generators or electrically excited generators may also be coupled to a gearbox which increases the rotational speed of the generator to for example between 50 and 500 rpm or even more.

Electrical machines comprise a rotor which rotates with respect the stator. The rotor may be the inner structure and the stator the outer structure. The stator in this case thus surrounds the rotor. Alternatively, in some configurations it may be the opposite, i.e. the rotor surrounds the stator.

In case of permanent magnet excited generators (PMG), permanent magnets (PM) are generally arranged on the rotor (although they could also be arranged alternatively in the stator structure), whereas winding elements (e.g. coils) are usually included in the stator (although they could alternatively be arranged in the rotor structure). Permanent magnet generators are generally deemed to be reliable and require less maintenance than other generator typologies.

Multiple permanent magnets may be provided in permanent magnet modules, which may be attached to the rotor as a single item. A permanent magnet module may be defined as a unit having a plurality of permanent magnets, such that the plurality of magnets can be mounted and unmounted together. Such a module may have a module base with a shape suitable for housing or carrying a plurality of permanent magnets that may be fixed to the base. The base may be configured to be fixed to a rotor rim in such a way that the plurality of magnets is fixed together to the rotor rim through the module base. The use of permanent magnet modules may facilitate the manufacturing of a rotor.

Electrically excited generators generally comprise a rotor having a plurality of pole shoes and excitation coils. In use, a current is applied to the excitation coils which creates the polarity of the poles. Adjacent poles have a different magnetic polarity. As the rotor turns, the magnetic field from the pole shoes is applied to the windings of the stator causing a variable magnetic flux in the stator windings or electrical windings which produces a voltage in the stator windings. In electrically excited synchronous generators, the magnetic field to generate the electrical power is created electrically. As a result, such generators do not require the use of permanent magnets containing rare earth elements.

The electromagnetic components of an electrical machine may be cooled to reduce heat losses such that the performance of the electrical machine may be optimized. A cooling system may be provided to cool the electromagnetic components of the rotor, e.g. permanent magnets, and/or of the stator, e.g. electrical windings. The electrical machine may comprise at least one cooling fluid inlet for allowing a cooling fluid to enter into the electrical machine and cooling the electromagnetic components. However, the cooling fluid flow rate received by different electromagnetic components, e.g. electrical windings arranged on the stator, may be considerably different. This may cause some electromagnetic components to operate at different temperatures which may reduce the efficiency of the overall electrical machine. This may particularly affect the electrical windings arranged on the stator of large electrical machines, since the distance between the cooling fluid inlet and each of the electrical windings is fixed. The cooling fluid flow rate received by each of these electrical windings may vary depending on the distance between the cooling fluid inlet and the electrical winding to be cooled. For example, electrical windings arranged close to the cooling fluid inlet may receive a higher cooling fluid flow rate than those electrical windings arranged far away from the cooling fluid inlet.

A dedicated fluid cooling inlet for each of the electrical components may be used to maintain the cooling fluid flow rate received by each of the electrical components within a predetermined range.

However, some electrical machines may comprise a stator structure, electrical connections, sensors or winding connections which may complicate integrating the cooling system into the electrical machine. Accordingly, dedicated fluid cooling inlets cannot be easily integrated in some electrical machines. This may specifically occur in electrical generators for direct drives wind turbines, in which the rotor of the generator may be directly coupled to the hub or to the rotor.

The size and type of electrical machines and the potential problems described herein are not limited to generators in direct drive offshore applications, and not even to the field of wind turbines only. Electrical machines of considerable dimensions that may suffer from the same problems and/or have the same complications may also be found e.g. in steam turbines and water turbines.

The present disclosure provides examples of systems and methods that at least partially resolve some of the aforementioned disadvantages.

SUMMARY

In one aspect, a stator structure for an electrical machine is provided. The stator structure comprises a circumferential support structure having an external rim to support a plurality of electrical windings . . . . The circumferential support structure comprises an air entrance, an air distribution channel and a plurality of axial air openings. The air entrance provides a passage between the air distribution channel and an outside of the stator structure. The air distribution channel extends through a portion of the circumferential support structure to circumferentially distribute an air flow from the air entrance. The plurality of axial air openings provides a passage between the air distribution channel and an outer side of the external rim to guide the air flow from the air distribution channel to the outer side of the external rim. The plurality of axial air openings comprises an aperture, wherein the apertures are sized and spaced such that the air flow is substantially uniform along the circumference of the outer side of the external rim.

Air flow from the air entrance may be guided along the circumference of the stator through the air distribution channel of the circumferential support to distribute the air flow along the circumference of the stator structure. The plurality of axial air openings may allow the air flow to exit from the air distribution channel to an outer side of the external rim. The apertures are sized and space such that air flow exiting the stator structure may be substantially uniformly distributed along the circumference of the outer side of the of the external rim. Influence of the position of the electrical windings with respect to the air entrance may thus be compensated. Air flow rate received by each of the electrical windings may be keep under a predetermined range. Accordingly, electrical windings that may be mounted on the external rim may be more efficiently cooled.

In a further aspect, the apertures of the plurality of axial air openings may be nonuniformly distributed along the circumferential support. The air flow at outer side of the external rim may thus substantially uniform.

In this disclosure, flow rate may indistinctly refer to volumetric flow rate (volume of fluid which passes per unit time) or to mass flow rate (mass of a substance which passes per unit of time).

In yet a further aspect, an electrical machine is provided. The electrical machine comprises a rotor extending from a first side to a second side and configured to rotate about a rotational axis, the rotor extending from, a stator and an air gap between the rotor and the stator. The stator comprises a stator structure according to any of the examples herein disclosed to direct an air flow from the air entrance to the air gap, and a plurality of electrical windings supported by the external rim of the stator structure.

According to this aspect, an air flow may be guided through the stator structure towards the air gap of the electrical machine. The air flow may thus be substantially uniformly distributed along the circumference of the air gap. This air flow may thus cool down the electromagnetic components of the rotor and of the stator arranged at the air gap. Electromagnetic components of a rotor may comprise magnet modules. Electromagnetic components of a stator may comprise electrical windings.

The electromagnetic components, e.g. electrical windings, arranged at the air gap may thus operate at a temperature within a predetermined range and the electrical machine may thus efficiently operate. As the stator structure is used to distribute the air flow along the circumference of the stator, a smaller number of air entrances may be required. Accordingly, integration constraints of mounting an electrical machine in for example a direct drive wind turbine may be minimized.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
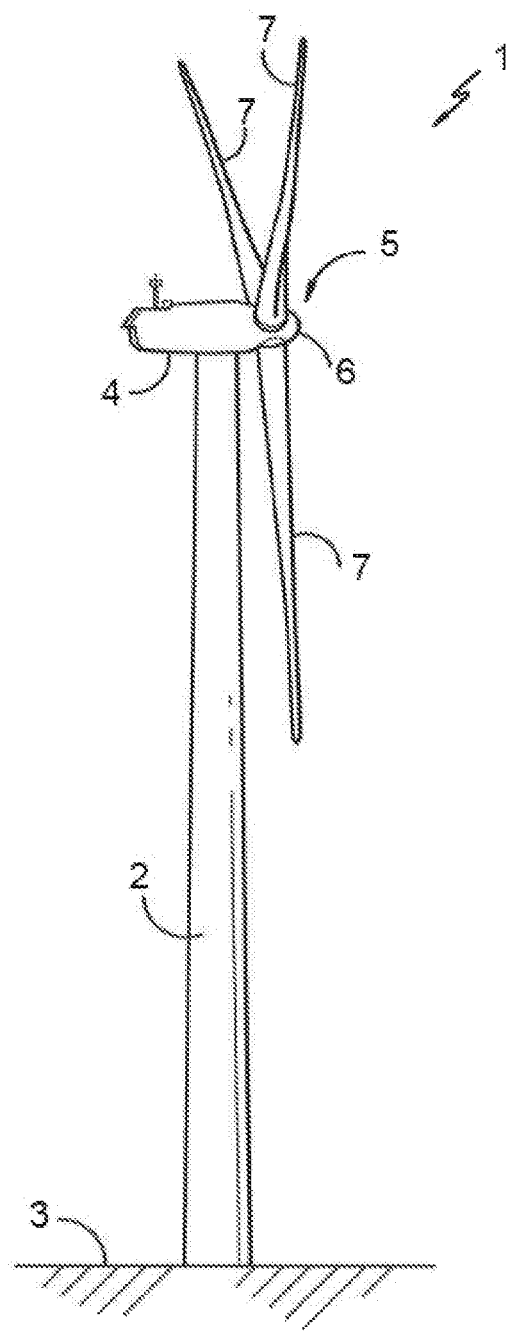
FIG. 1 illustrates a perspective view of a wind turbine according to one example of the present disclosure.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. The rotation of the rotor may be directly transmitted, e.g. in direct drive wind turbines, or through the use of a gearbox to a generator.

Figure 2:
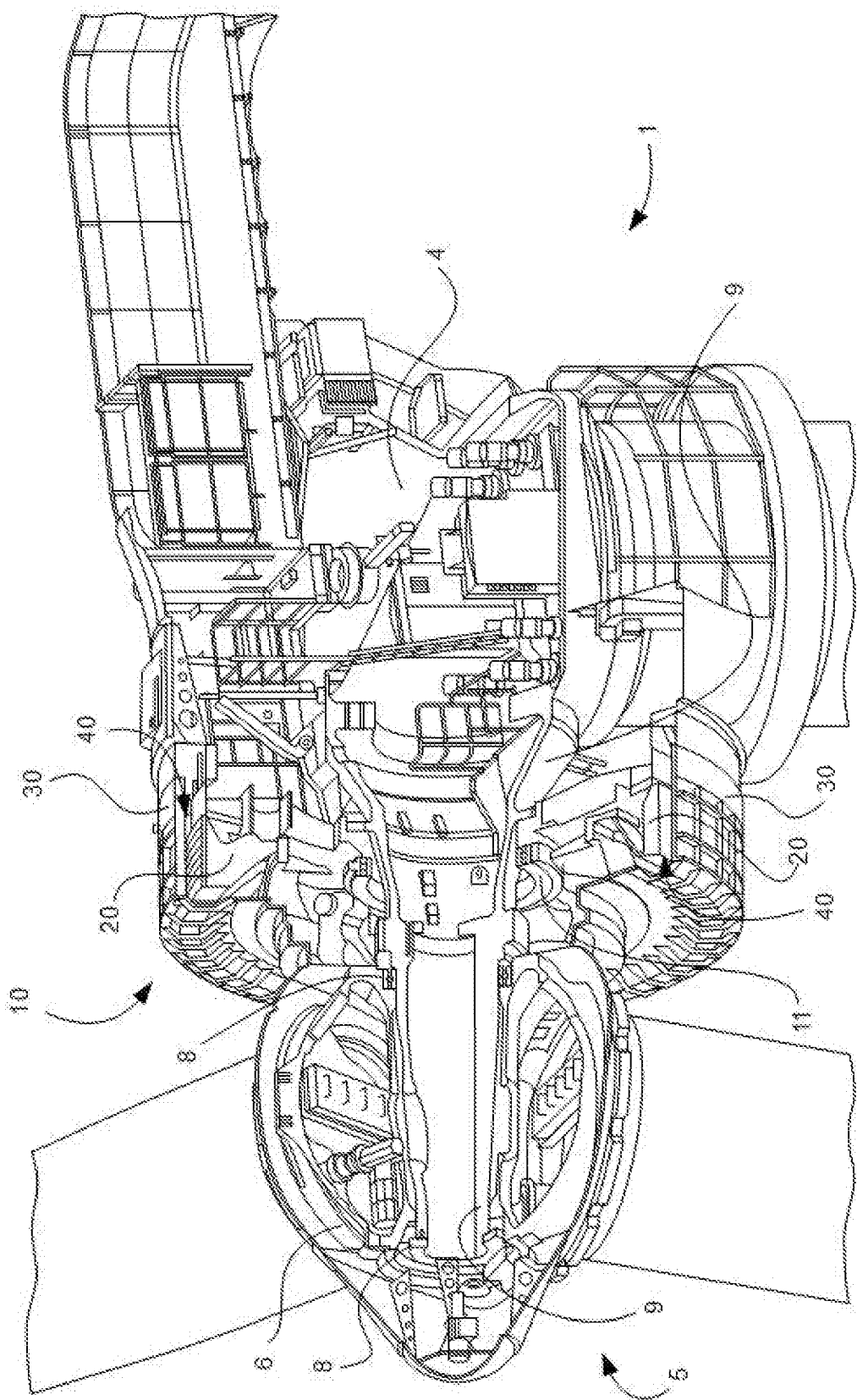
FIG. 2 illustrates a simplified, internal view of a nacelle of a wind turbine according to one example of the present disclosure.

FIG. 2 illustrates a simplified, internal view of one example of a nacelle 4 of a direct drive wind turbine 1. As shown, the generator 10 may be disposed within the nacelle 4 or between the nacelle 4 and the rotor 5. In general, the generator 10 may be coupled to the rotor 5 of the wind turbine 1 for generating electrical power from the rotational energy generated by the rotor 5. For example, the rotor 5 of the wind turbine may include a hub 6 coupled to a rotor 20 of a generator 10 for rotation therewith. The rotation of the hub 6 may thus drive the rotor 20 of the generator 10.

In FIG. 2, the wind turbine rotor 5 may be rotatably mounted on a support frame 9 through two rotor bearings 8. In other examples, the support frame 9 may not extend through the hub 6 and therefore the rotor may be supported by a single rotor bearing 8, commonly called as the main bearing.

The generator 10 may be electrically coupled to the converter. The wind turbine converter may adapt the output electrical power of the generator to the requirements of the electrical grid.

The generator 10 may comprise a rotor 20 and a stator 30. In FIG. 2, the stator 30 is surrounding the rotor 20, however, in other examples, the rotor may surround the stator. Between the stator 30 and the rotor 20 an air gap 40 is arranged. The stator may be rigidly mounted on the support frame 9. The rotor may be rotatably mounted on the stator through a generator bearing 11 so that the rotor may rotate with respect to the stator about a rotational axis. The rotor may extend from a first side, e.g. form inside the nacelle 4, to a second side, the wind turbine rotor 5.

As may be appreciated in FIG. 2, the stator 30 and the components adjacent to the generator may hinder the integration of a cooling system inside the nacelle.

Figure 3:
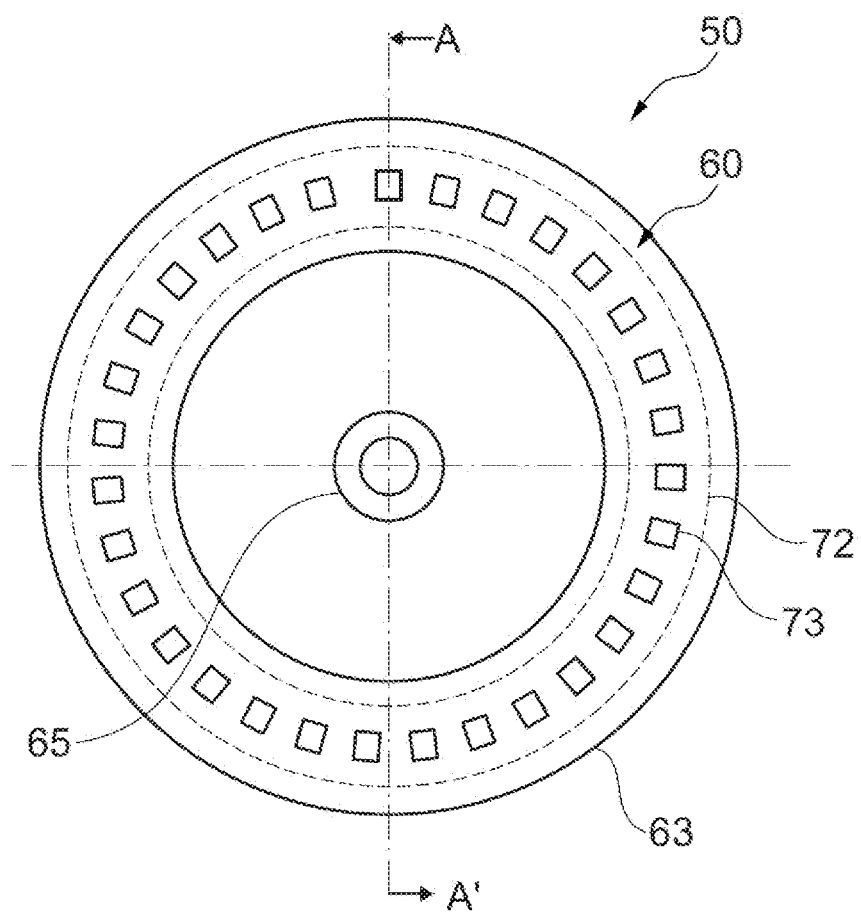
FIG. 3 and FIG. 4 schematically represents a frontal view and a cross-sectional view along the line A-A' respectively of a stator structure according to one example of the present disclosure.
Figure 4:
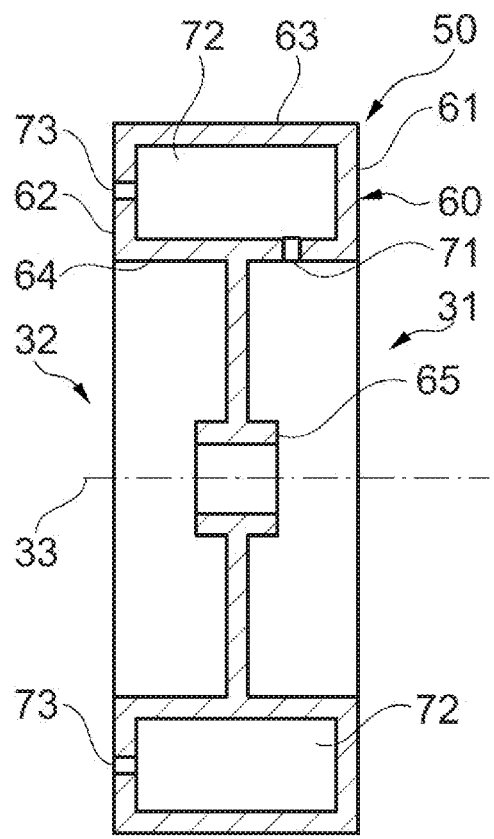

FIG. 3 and FIG. 4 schematically represents a frontal view and a sectional view along the line A-A' respectively of a stator structure according to one example of the present disclosure.

The stator structure 50 of these figures comprises a circumferential support 60 having an external rim 63 to support a plurality of electrical windings. Electrical windings may thus be mounted on the external rim 63. In this example, the stator structure 50 may be used in an electrical machine in which the stator surrounds the rotor. In these figures, the stator structure 50 extends from a first side 31 to a second side 32 along a rotational axis 33 of an electrical machine.

The circumferential support 60 comprises an inner air distribution channel 72 extending through a portion of the circumferential support 60. In this example, the air distribution channel 72 (represented in FIG. 3 by a dotted line) extends along the whole circumferential support 60. The air distribution channel 72 may be formed by a first lateral wall 61 arranged at the first side 31, a second lateral wall 62 arranged at the second side 32, the external rim 63 and a bottom wall 64. In this example, the first lateral wall 61 and the second lateral wall 62 extend radially, whereas the external rim 63 and the bottom wall 64 are substantially parallel to the axis 33.

In this example, the air distribution channel 72 comprises a substantially rectangular cross-section. In other examples, the air distribution channel may comprise another quadrilateral or a substantially oval cross-section. In some examples, the air distribution channel may comprise radial spokes to increase the stiffness of the circumferential support.

The circumferential support 60 further comprises a cold air entrance 71 providing a passage between the air distribution channel 72 and an outside of the stator structure 50. In addition, the circumferential support 60 comprises a plurality of axial air openings 73 providing a passage between the air distribution channel 72 and an outer side of the external rim 63. In this example, the plurality of axial air openings comprises 36 openings. In some examples, the circumferential support may comprise 20-60 axial air openings, specifically 25-50 axial air openings. In these figures, the plurality of axial air openings is distributed along the circumferential support 60.

A cold air flow may thus enter into the air distribution channel 72 through the air entrance 71, then it may be distributed through the air distribution channel 72 along the whole circumference of the stator structure and exit through the plurality of axial air openings 73 to substantially homogeneously distribute the air flow rate along the circumference of formed by the outer side of the external rim 63.

In this example, the air entrance 71 is shown to be substantially radially arranged. However, in other examples the air entrance may be substantially axially arranged, i.e. parallel to the axis 33.

The plurality of axial openings 72 of these figures is arranged at the second side 32 while the air entrance 71 is substantially arranged at the first side 31. In some examples, the plurality of axial air openings 72 may be arranged on the second lateral wall 62. The air entrance 71 may be arranged on the first lateral wall 61. In other examples the air entrance may be arranged on the bottom wall. In other examples, the plurality of axial openings and the air entrance may be arranged at the same side, e.g. at the first side.

In these figures, the plurality of axial air openings has an aperture with a substantially rectangular shape. The apertures in these figures are nonuniformly distributed along the circumferential support. In some examples, distance between the axial air openings may be different. In some examples, size of the aperture of the axial air openings may be different.

In other examples, the plurality of axial air openings may have a square or a circular shape. In further examples, some axial air openings may have a substantially rectangular shape and other axial air openings may have a different shape.

In FIGS. 3 and 4, the stator structure further comprises a flange 65 to connect the stator structure to e.g. a support structure of a wind turbine.

In some examples, the circumferential support may comprise a plurality of air entrances. For example, the circumferential support may comprise 4-6 air entrances. However, the number of air entrances may be limited by accessibility or space constraints. In addition, the air entrances may be nonuniformly distributed along the circumferential support. For example, this may occur if the stator structure is arranged in a wind turbine, since the position of the air entrances may depend on the integration of the electrical generator in the wind turbine.

The influence of the position of the air entrances on the air flow passing through the plurality of the axial air openings may be minimized by forcing the distribution of the air flow along the air distribution channel and by a nonuniform distribution of the aperture of the axial air openings along the circumference of the stator structure. A different distance between some axial air openings and/or a different aperture of some axial air openings may help to make the air flow rate exiting from the air distribution channel along the circumference of the stator structure more homogeneous.

In some examples, the plurality of axial air openings may be nonuniformly distributed along the circumferential support. Accordingly, the apertures of the axial air openings may also be nonuniformly distributed. For example, a distance between two adjacent axial air openings close to the air entrance(s) may be higher than between two adjacent axial air openings far away from the air entrance(s). This may regulate the air flow rate towards an outer side of the external rim along the circumference of the stator support. However, in other examples, the plurality of axial air openings may be substantially uniformly distributed along the circumferential support.

In some examples, an aperture of at least two axial air openings of the plurality of axial air openings may have a different size. The apertures are thus not uniformly distributed along the circumference of the stator structure. For example, the aperture of the air openings arranged relatively close to the air entrance(s) may be smaller than the aperture of the air openings relatively far away from the air entrance(s). This may help to compensate the influence of the position of the air entrances. Accordingly, the air flow rate passing through the plurality of air openings may be more homogeneous. A better distribution of the air flow along the complete circumference of the stator structure may thus be achieved.

In some examples, an axial air opening of the plurality of axial air openings may comprise a blocking system to adjust an aperture of the axial air opening. Accordingly, the shape and size of the aperture of the axial air opening may be modified. Air flow passing through the axial air opening may thus be reduced. In some examples, several axial air openings of the plurality of axial air openings may comprise a blocking system. In further examples, each of the axial air openings of the plurality of axial air openings may comprise a blocking system.

Figure 5:
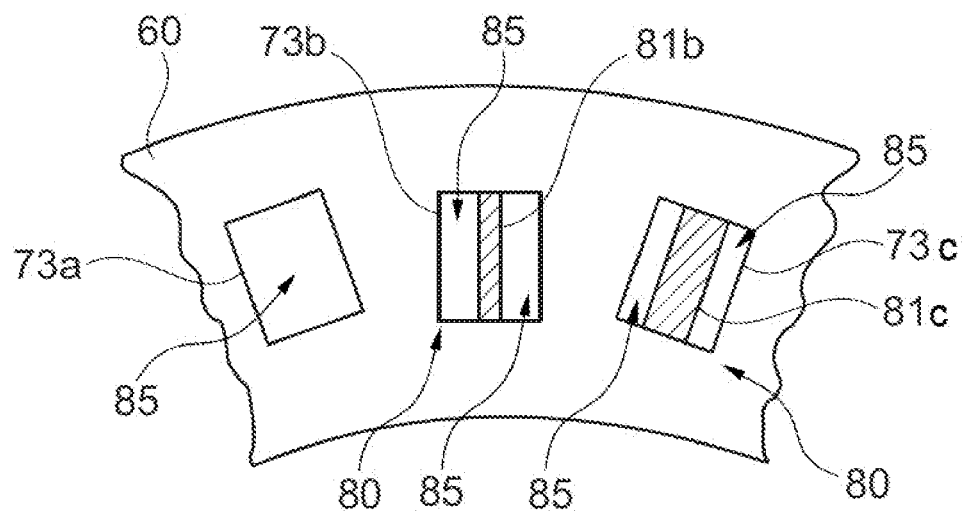
FIG. 5 schematically represents a portion of a circumferential support of a stator structure according to one example of the present disclosure.

FIG. 5 schematically represents a portion of a circumferential support of a stator structure according to one example of the present disclosure. The portion of the circumferential support 60 of this figure comprises three axial air openings 73a, 73b and 73c. These axial air openings are perforated in a second lateral side of the circumferential support.

In this figure, the axial air openings 73a, 73b and 73c comprise a substantially rectangular shape having a length extending substantially tangentially to the circumference of the stator structure and a height extending radially with respect to the circumference of the stator structure. However, other shapes may also be suitable. Although the axial air openings 73a, 73b and 73c depicted in FIG. 5 have the same size, some air openings may have a different size. For example, the length of axial air openings may be different.

The axial air opening 73a of this figure comprises an aperture 85 defined by the length and the height of the axial air opening. The aperture may thus correspond to the shape of the opening. However, the axial air openings 73b and 73c of FIG. 5 comprise a blocking system 80 that reduces the aperture 85 of the axial air openings. Accordingly, the aperture 85 of the axial air openings 73b and 73c is smaller than the shape of the axial air opening. This blocking system 80 may hinder the passage of an air flow through these axial air openings.

The blocking system 80 of this figure comprises a blocking element 81 covering a portion of the axial air opening to adjust its aperture 85. Blocking elements arranged on different axial air openings may have a different shape or size. For example, the blocking element 81c is greater than the blocking element 81b. Accordingly, the aperture 85 of the axial air opening 73b is greater than the aperture of the axial air opening 73c. The blocking elements may have a height similar to the height of the axial air opening in which is arranged.

As the shape and sizes of the apertures is different in these axial air openings, the distance between the also varies. Accordingly, the apertures are not uniformly distributed along the circumferential support. In some examples, even if the axial air openings are uniformly distributed along the circumferential support, the distribution of the apertures may still not be uniform as the shape and/or size of the apertures is different In some examples, a blocking element may cover a portion between 20% and 80% of an axial air opening. In further examples, a blocking element may be configured to substantially cover an axial air opening.

In some examples, the blocking element may be connected to the circumferential support. An adhesive or a fastener may be used to connect the blocking element to the circumferential support. Alternatively, or additionally, the blocking element may snap into the axial air opening. An aperture of an axial air opening may be modified by replacing one blocking element by another blocking element with a different size.

In some examples, a blocking element may be slidably connected the circumferential support. The blocking element may thus slide perpendicularly to an axial air opening to modify its aperture.

In some examples, the blocking element may be rotatably connected to the circumferential support. For example, the blocking element may rotate about a rotational axis parallel to the radius of the stator structure. Accordingly, a portion of the blocking element covering the axial air opening may depend on the rotation of the blocking element around the rotational axis. Accordingly, the aperture of the axial air opening may be easily modified. Replacing a blocking element by another blocking element with a different area may thus be avoided.

In some examples, a retainer may be used to retain a blocking element in a desirable angle of rotation.

In some examples, the blocking system may comprise an actuator to move the blocking element for adjusting the aperture of the axial air opening. The actuator may modify the angle of rotation of the blocking element around the rotational axis or the position of the blocking element. Accordingly, the aperture may be modified.

Figure 6:
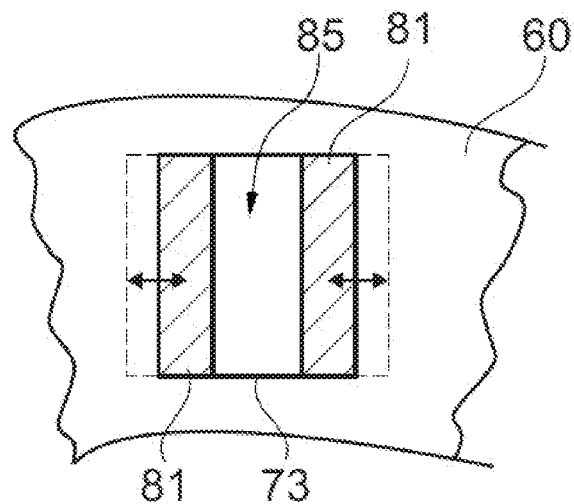
FIG. 6 schematically represents a portion of a circumferential support of a stator structure according to another example of the present disclosure.

FIG. 6 schematically represents a portion of a circumferential support of a stator structure according to another example of the present disclosure. The portion of the circumferential support 60 illustrated in this figure comprises an axial air opening 73 having a blocking system 80 adjusting the aperture 85. The blocking system 80 of this figure comprises two blocking elements 81.

In this figure the blocking elements 81 are slidably connected to the circumferential support and may be move towards each other. For example, the right blocking element may be moved towards the left blocking element to reduce the aperture 85. The aperture may thus be precisely adjusted. In this example, the blocking elements may be moved substantially tangentially to the circumference of the stator structure, however, in other examples the blocking elements may move along a radius of the stator structure.

In some examples, an actuator may move the blocking elements. In other examples, a retainer, e.g. a screw, may retain a blocking element in a fixed position.

In some examples, the plurality of axial air openings may comprise a blocking system according to any of the examples herein disclosed. Air flow rate exiting from the plurality of axial air openings may be precisely controlled to substantially homogeneously distribute the air flow rate along the whole circumference of the stator structure. In some examples, some axial air openings may comprise a blocking system. In all these examples, the blocking system may be different in different axial air openings.

Figure 7:
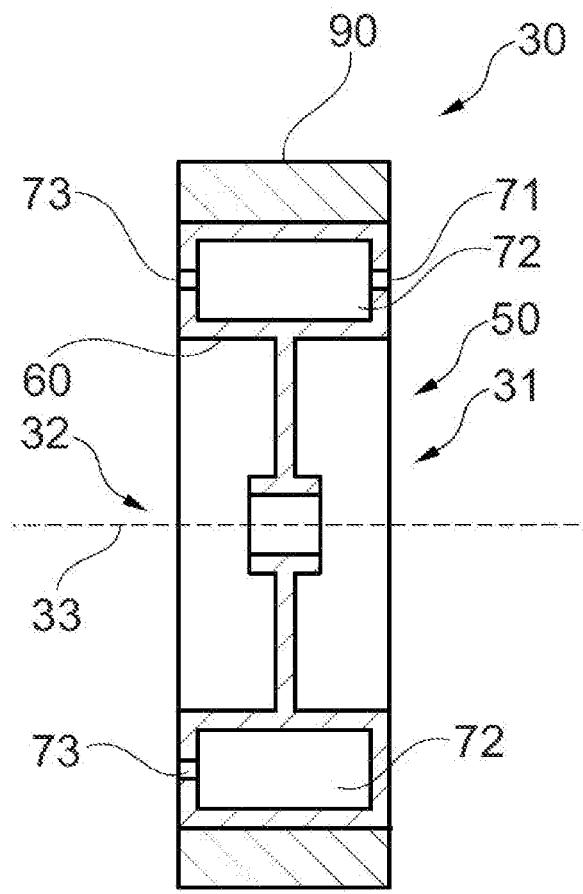
FIG. 7 schematically represents a cross-sectional view of a stator for an electrical machine.

FIG. 7 schematically represents a cross-sectional view of a stator for an electrical machine. The stator 30 of this figure comprises a plurality of electrical windings 90 and a stator structure 50.

The stator structure 50 may be according to any of the examples herein disclosed. In this figure, the stator structure 50 comprises a circumferential support 60 extending from a first side 31 to a second side 32 along a rotational axis 33 of an electrical machine. The circumferential support comprises an external rim to support the plurality of electrical windings 90.

In this example, the circumferential support 60 comprises an air entrance 71, a air distribution channel 72 and a plurality of axial air openings 73. The air entrance 71 may be arranged at the first side 31 of the circumferential support 60 to provide a passage between the air distribution channel 72 and an outside of the stator structure 50. The air distribution channel 72 extends through a portion of the circumferential support 60 to circumferentially distribute an air flow from the air entrance 71. In this example, the plurality of axial openings 73 are arranged at the second side 32 of the circumferential support 50 and provides a passage between the air distribution channel 72 and an the outer side of the external rim of the stator structure 50 to guide an air flow from the air distribution channel 72 to the electrical windings 90.

Air flow may enter into the air distribution channel of the circumferential support through the air entrance arranged at the first side, then the air flow may be distributed along the circumference support structure through the air distribution channel and may exit through the plurality of axial openings arranged at the second side to cool the electrical windings. The air flow may thus be distributed along the circumference of the stator to substantially homogeneously distribute the air flow rate received by each of the electrical windings of the plurality of the electrical windings.

Although not shown in FIG. 7, the plurality of axial air openings comprises an aperture. The apertures of these examples are nonuniformly distributed along the circumferential support.

Figure 8:
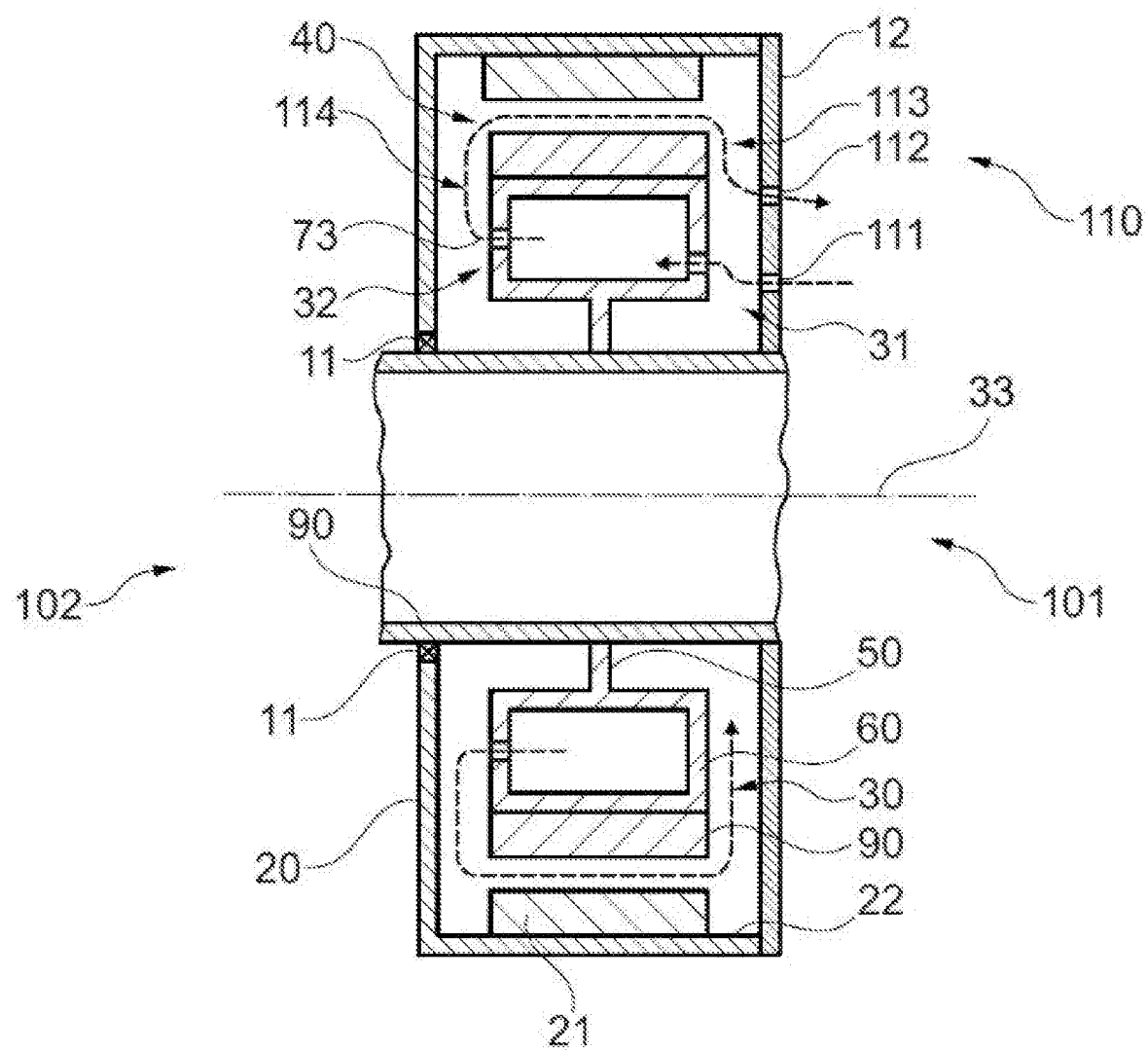
FIG. 8 schematically represents a cross-sectional view of an electrical machine according to one example of the present disclosure.

FIG. 8 schematically represents a cross-sectional view of an electrical machine according to one example of the present disclosure.

In some examples, an electrical machine may comprise a stator or a stator structure according to any of the examples herein disclosed. The electrical machine may be a direct drive wind turbine generator. In some of these examples, the generator may be a permanent magnet generator.

The electrical machine 10 of FIG. 8 is an electrical generator, specifically a direct drive wind turbine generator.

The electrical generator 10 of FIG. 8 comprises a rotor 20 extending from a first side 101 to a second side 102 and configured to rotate about a rotational axis 33, a stator 30, an air gap 40 between the rotor 20 and the stator 30.

The stator 30 of this figure comprises a plurality of electrical windings 90 and a stator structure 50 comprising a circumferential support 60 supporting the plurality of electrical windings 90. The stator structure 50 extends from a first side 31 to a second side 32 along the rotational axis 33 of the electrical generator.

The electrical generator 10 of FIG. 8 further comprises an air-cooling system 110 to cool the plurality of electrical windings 90. In this example, the air-cooling system 110 comprises an electrical machine air inlet 111, an air distribution channel 72 extending through a portion of the circumferential support 60 and an electrical machine air outlet 112 in fluid communication with the air gap 40. The electrical machine air inlet may allow an air flow to enter into the electrical machine.

The air distribution channel 72 of this example comprises an air entrance 71 in fluid communication with the electrical machine air inlet 111 and being arranged at the first side 31 of the circumferential support 60 and. The air distribution channel further comprises a plurality of axial air openings 73 arranged at the second side 32 of the circumferential support 60 in fluid communication with the air gap 40 to distribute an air flow from the electrical machine air inlet 111 along the air gap 40.

In the electrical generator 10 of this figure, the rotor 20 surrounds the stator 30. The rotor is rotatably mounted on a supporting frame 9 of a wind turbine through a generator bearing 11. The rotor 20 may be connected to a rotor hub of a wind turbine (not shown in this figure) which makes it to rotate. The stator 30 may be rigidly connected to a supporting frame 9 of a wind turbine. The electrical windings 90 are arranged on an outer side of an external rim of the circumferential support and magnet modules 21 may be arranged on an inner side of an external rotor rim 22.

In the example of this figure, the electrical generator comprises cover plate 12 arranged at the first side 101. The cover plate 12 may close the electrical generator and may be fixedly attached to supporting frame 9 of a wind turbine. A sealing member may be arranged between a portion of the rotor rim 22 close to the first side 101 and the cover plate 12.

In other examples, the cover plate 12 may form part of the rotor 20. In some of these examples, an additional generator bearing may rotatably connect the cover plate with the supporting frame of a wind turbine.

Cold air flow may enter into the electrical generator 10 through the electrical machine air inlet 111. This cold air flow may be guided through the stator structure 50 and the plurality of axial air openings 73 towards the air gap 40 of the electrical generator 10. The air flow may thus be substantially uniformly distributed along the circumference of the air gap 40. This cold air flow may thus cool down the electromagnetic components of the rotor and of the stator arranged at the air gap 40. The air flow may axially pass through the air gap from the second side 102 to the first side 101 to cool down the electromagnetic components arranged at the air gap. Heat from the electromagnetic components is transferred to the air flow and the temperature of the air flow at the first side 101 may be higher than at the second side 102. This hot air flow may then exit the electrical generator through the electrical machine air outlet 112 to be cooled down in a heat exchanger. The electrical machine air outlet may allow an air flow to exit the electrical machine.

The electromagnetic components, e.g. electrical windings, arranged at the air gap may thus operate at a temperature within a predetermined range and the electrical machine may thus efficiently operate. As the stator structure is used to distribute the air flow along the circumference of the stator, a smaller number of air entrances may be required. Accordingly, integration constraints of mounting an electrical generator in for example a direct drive wind turbine may be minimized.

The air-cooling system according to this figure, comprises a second side radial air channel 114 radially extending between the second side 32 of the circumferential support 60 and the second side 102 of the rotor 20. The second side radial air channel 114 may communicate the plurality of axial air openings 73 with the air gap 40.

The air-cooling may comprise a first side radial air channel 113 radially extending between the first side 31 of the circumferential support 60 and the first side 101 of the rotor 20. The first side radial air channel 113 may communicate the air gap 40 with the electrical machine air outlet 112.

In some examples, the cooling system may comprise a heat exchanger. The heat exchanger may comprise a first fluid circuit and a second fluid circuit. The first fluid circuit may be connected to the cooling system to cool the electrical machine. The second fluid circuit may cool the fluid flowing along the first fluid circuit. The fluid of the second fluid circuit may be for example air or water. The first fluid circuit may comprise a heat exchanger air inlet connected to the electrical machine air outlet to receive a warm air flow from the air gap. In addition, the first fluid circuit may comprise a heat exchanger air outlet connected to the electrical machine air inlet to deliver an air flow to the air gap. A conduit may be arranged between the electrical machine air outlet and the heat exchanger air inlet to guide the air flow towards the heat exchanger. A conduit may connect the heat exchanger air outlet to the electrical machine air inlet.

Air flow from the air gap may be cooled down by the second fluid circuit and this cooled air flow may be inputted to the electrical machine through the electrical machine air inlet to cool down the electromagnetic components arranged on the air gap.

In some examples, the air distribution channel may comprise a plurality of air entrances. The plurality of air entrances may be nonuniformly distributed along the circumference of the circumference support structure. A conduit or a plurality of conduits may connect the electrical machine air inlet to the air entrance(s) of the air distribution channel.

The air flow rate passing through the air gap along the whole circumference may be homogenized by for example varying the distance between two adjacent axial air openings and/or varying the aperture of the axial air openings. Therefore, an air flow rate passing through the plurality of axial air openings may be between a lower and an upper air flow limit. For example, the air mass flow rate passing through the axial air openings may between 0.3 kg/s and 1.5 kg/s (0.66 lb/s and 3.31 lb/s). In some examples, the air mass passing through each of the axial air openings may be between 0.6 kg/s and 1.2 kg/s (1.32 lb/s and 2.65 lb/s).

In some examples, an axial air opening of the plurality of axial air openings may comprise a blocking system to adjust an aperture of the axial air opening. The blocking system may comprise a blocking element to cover at least a portion of the axial air opening. In some examples, a blocking element may be configured to entirely cover the axial air opening.

During operation of a wind turbine, an electrical winding may fail during operation of a wind turbine. Replacing this failed electrical winding may be required. However, the electrical generator may still operate with a failed electrical winding. As the failed electrical winding is not working, cooling this failed electrical winding may not be required. Axial air openings close to this failed electrical winding may be covered or blocked by blocking elements. Air flow may thus be directed to other electrical windings.

In some examples, the blocking system may comprise an actuator to move the blocking element for adjusting the aperture of an axial air opening. The aperture of an axial air opening may thus be modified when the wind turbine is operating. For example, several axial air openings may comprise a blocking element and an actuator to modify the aperture of these axial air openings. Air flow towards the air gap may be adapted to the temperature of the electromagnetic components of the wind turbine generator. Accordingly, the efficiency of the wind turbine may be optimized.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A stator structure for an electrical machine, the stator structure comprising:
    a circumferential support having an external rim to support a plurality of electrical windings, wherein the circumferential support comprises:
        an air entrance arranged at a first lateral side;
        a circumferentially extending air distribution channel defined by the external rim, the first lateral side, and an opposite second lateral side;
        a plurality of axial air openings defined in the opposite second lateral side;
        the air entrance providing a passage between the air distribution channel and an outside of the stator structure;
        the air distribution channel extending through a portion of the circumferential support to circumferentially distribute an air flow from the air entrance;
    the plurality of axial air openings and the air entrance configured such that an air flow is established through the air entrance in the first lateral side, into and across the air distribution channel, through the plurality of axial air openings in the second lateral wall to and axiall along an outer side of the external rim to the first lateral side, the plurality of axial air openings each comprising an aperture; and
    wherein the apertures are nonuniformly distributed along the circumferential support.

2. The stator structure according to claim 1, wherein the circumferential support comprises a plurality of the air entrances.

3. The stator structure according to claim 2, wherein the air entrances are nonuniformly distributed along the circumferential support.

4. The stator structure according to claim 1, wherein the aperture of at least two of the axial air openings have a different size.

5. The stator structure according to claim 4, wherein the plurality of axial air openings are substantially uniformly distributed along the circumferential support.

6. The stator structure according to claim 1, wherein the plurality of axial air openings are nonuniformly distributed along the circumferential support.

7. The stator structure according to claim 1, wherein one or more of the axial air openings comprise a blocking system to adjust the aperture of the axial air opening.

8. The stator structure according to claim 7, wherein the blocking system comprises a blocking element slidably or rotatably connected to the circumferential support.

9. The stator structure according to claim 1, wherein the plurality of axial air openings are configured to control an air flow rate passing through the plurality of axial air openings.

10. The stator structure according to claim 1, wherein the circumferential support comprises a first lateral wall arranged at the first lateral side and a second lateral wall arranged on the second lateral side, and wherein the plurality of axial air openings is arranged on the second lateral wall.

11. An electrical machine comprising:
    a rotor extending from a first to a second side and configured to rotate about a rotational axis:
    a stator;
    an air gap between the rotor and the stator;
    the stator comprising:
    the stator structure according to claim 1 to direct an airflow from the air entrance at the first lateral side, into and across the air distribution channel, out the plurality of axial air openings at the second lateral side, through the air gap and back to the first lateral side; and
    a plurality of electrical windings supported by the external rim of the stator structure.

12. An electrical machine according to claim 11, wherein the electrical machine comprises:

an electrical machine air inlet in fluid communication with the air entrance of the circumferential support to allow an air flow to enter into the electrical machine; and an electrical machine air outlet in fluid communication with the air gap to allow an air flow to exit the electrical machine.

13. The electrical machine according to claim 11, wherein the rotor surrounds the stator.

14. The electrical machine according to claim 11, wherein the electrical machine is a wind turbine generator.

\* \* \* \* \*